United States Patent [19]

Takeuchi

[11] Patent Number: 5,452,071
[45] Date of Patent: Sep. 19, 1995

[54] METHOD OF MEASURING OPTICAL ATTENUATION USING AN OPTICAL TIME DOMAIN REFLECTOMETER

[75] Inventor: Nobuaki Takeuchi, Tokyo, Japan

[73] Assignee: Ando Electric Co., Ltd., Tokyo, Japan

[21] Appl. No.: 181,305

[22] Filed: Jan. 13, 1994

[30] Foreign Application Priority Data

Jan. 29, 1993 [JP] Japan .................. 5-034235

[51] Int. Cl.⁶ .......................................... G01N 21/88
[52] U.S. Cl. ................................................ 356/73.1
[58] Field of Search ................................. 356/73.1

[56] References Cited

U.S. PATENT DOCUMENTS

| 4,304,489 | 12/1981 | Wakabayashi et al. | 356/73.1 |
| 5,187,362 | 2/1993 | Keeble | 356/73.1 X |
| 5,251,001 | 10/1993 | Dave et al. | 356/73.1 |

FOREIGN PATENT DOCUMENTS

| 0432734 | 6/1991 | European Pat. Off. | |
| 3512186 | 10/1986 | Germany | |
| 4013884 | 10/1991 | Germany | 356/73.1 |

OTHER PUBLICATIONS

Optische Telekommunikationssysteme, W. Haist, Hrsg., Bd. I: Physik und Technik, Gelsenkirchen-Buer 1989, Seiten 245–249.

"Fiber Measurement Techniques For Passive Double Star Networks", Izumi Sankawa et al., Third IEEE Workshop on Local Optical Networks, vol. 9, pp. 4.2-2–4.2-10 (1991).

Primary Examiner—Vincent P. McGraw
Attorney, Agent, or Firm—Finnegan, Henderson, Farabow, Garrett & Dunner

[57] ABSTRACT

The optical reflector plates 11, 12 and 13 are connected at the ends of the optical fiber cables 8, 9, and 10, respectively. An optical waveguide directional coupler 2 which has at least one input common terminal A and at least two output terminals B and C is provided between an OTDR 1 and a measuring optical fiber cable 5. The output terminal B is connected to an end of the optical fiber cable 6, and the output terminal C is connected to an optical reflector plate 4 through an optical variable attenuator 3 which can changed the optical attenuation of passing light. The OTDR 1 supplies a light pulse to the input common terminal A, and measures the optical attenuation of the measuring optical fiber cable 5 by using differences in the intensity of reflected light pulses, which are reflected at each optical reflector plate 4, 11, 12, and 13.

4 Claims, 5 Drawing Sheets

METHOD OF MEASURING OPTICAL ATTENUATION USING AN OPTICAL TIME DOMAIN REFLECTOMETER

BACKGROUND OF THE INVENTION

1. Field of the Invention

The present invention relates to a method of measuring optical attenuation of an optical fiber cable including an optical branching waveguide using an optical time domain reflectometer.

2. Background Art

An optical time domain reflectometer (OTDR) is used to detect a point which is damaged, or to measure an energy loss, such as a transmission loss or a connection loss in an optical fiber cable by outputting a light pulse from the OTDR to a measuring optical fiber cable through an optical waveguide directional coupler and by detecting a returned light pulse from the measuring optical fiber cable.

FIG. 4 is a block diagram showing a measurement system for a conventional method of measuring optical attenuation. In FIG. 4, a schematic diagram of a measuring optical fiber cable 5 consisting of an optical branching waveguide 7, an optical fiber cable 6 at the supplying side, and optical fiber cables 8, 9, 10, . . . , is shown. The optical fiber cable 6 has a common input terminal and a plurality of output terminals. One end of the optical fiber cable 6 is connected to the common supplying terminal of the optical branching waveguide 7, and one end of each optical fiber cable 8, 9, 10, . . . is connected to each output terminal of the optical branching waveguide 7.

In a conventional method, an operation to measure attenuation is carried out by connecting an OTDR 1 to the optical fiber cable 6 which is a common optical fiber of the measuring optical fiber cable 5. In this case, it is necessary to secure an extremely large dynamic range of the OTDR 1, as described in "FIBER MEASUREMENT TECHNIQUES FOR PASSIVE DOUBLE STAR NETWORKS", Third IEEE Workshop on Local Optical Networks; 1991, Vol. 9, pp. 24–25.

As described in the above-mentioned reference, for example, when the number of branches of the optical branching waveguide 7 is 32, the dynamic range of the OTDR 1 must be approximate 32 dB without energy loss from the optical fiber, and this is not practical.

Furthermore, another method of measuring optical attenuation uses an optical power meter and an optical light source as a measurement apparatus. However, each measuring apparatus must be placed at an end of the optical fiber cable, respectively. In addition, each optical fiber must be measured along every branch. As a result, the measurement operations are troublesome. Furthermore, in the case of a line which is in service, the measuring apparatuses must be placed at the ends of all branches, and this is not practical.

SUMMARY OF THE INVENTION

Accordingly, it is an object of the present invention to provide a method for measuring the optical attenuation in an optical fiber cable including an optical branching waveguide by using an optical time domain reflectometer.

In an aspect of the present invention, there is provided a method of measuring optical attenuation in an optical fiber cable including an optical branching waveguide, by using an optical time domain reflectometer, said optical fiber cable consists of an optical branching waveguide which has at least one input common terminal and a plurality of output branching terminals, an optical fiber cable one terminal thereof being connected to said input common terminal, a plurality of optical fiber cables at an output side, each optical fiber cable having different lengths, which are connected to said plurality of output branching terminals, respectively, said method of measuring optical attenuation comprising the steps of: terminating each terminal of said plurality of optical fiber cables with optical reflector plates, respectively, providing an optical waveguide directional coupler which has at least one input common terminal and at least two output branching terminals, connecting another terminal of said optical fiber cable to a first terminal of said at least two output branching terminals, and terminating a second terminal of said at least two output branching terminals through an optical variable attenuator which can changed the optical attenuation of passing light, and supplying a light pulse from said optical time domain reflectometer which is connected to said input common terminal, measuring optical attenuation of an optical fiber cable by using differences in the intensity of reflected light pulses which are reflected at each optical reflector plate.

Therefore, in accordance with this invention, it is possible to measure an energy loss of each optical fiber cable, which has an optical branching waveguide, at one end of the each optical cable. Furthermore, a dynamic range of the OTDR which is used in the present method of measuring the optical cable, can be less approximately 33 dB compared with the above-described conventional method.

DETAILED DESCRIPTION OF THE PREFERRED EMBODIMENTS

Further objects and advantages of the present invention will be apparent from the following description, with reference being made to the accompanying drawings wherein the preferred embodiments of the present invention are clearly shown.

Figure 1:
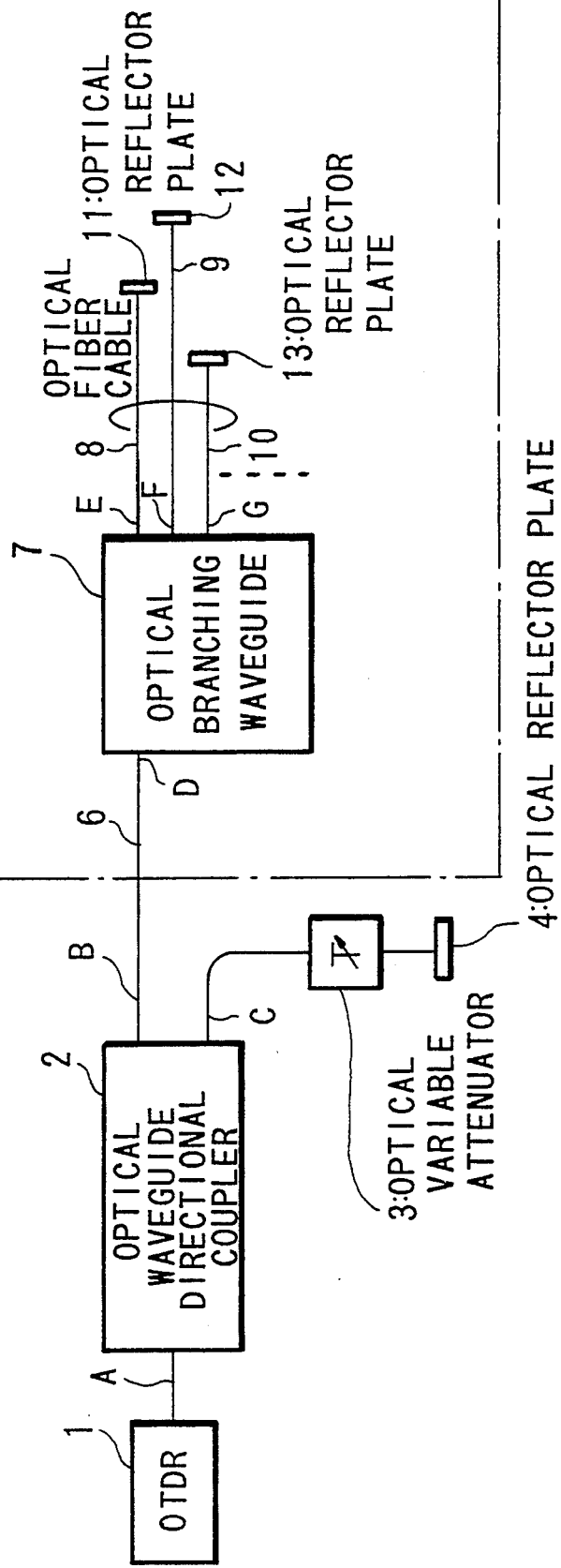
FIG. 1 is a block diagram showing a measuring system for measuring optical attenuation according to an embodiment of the present invention.
Figure 2:
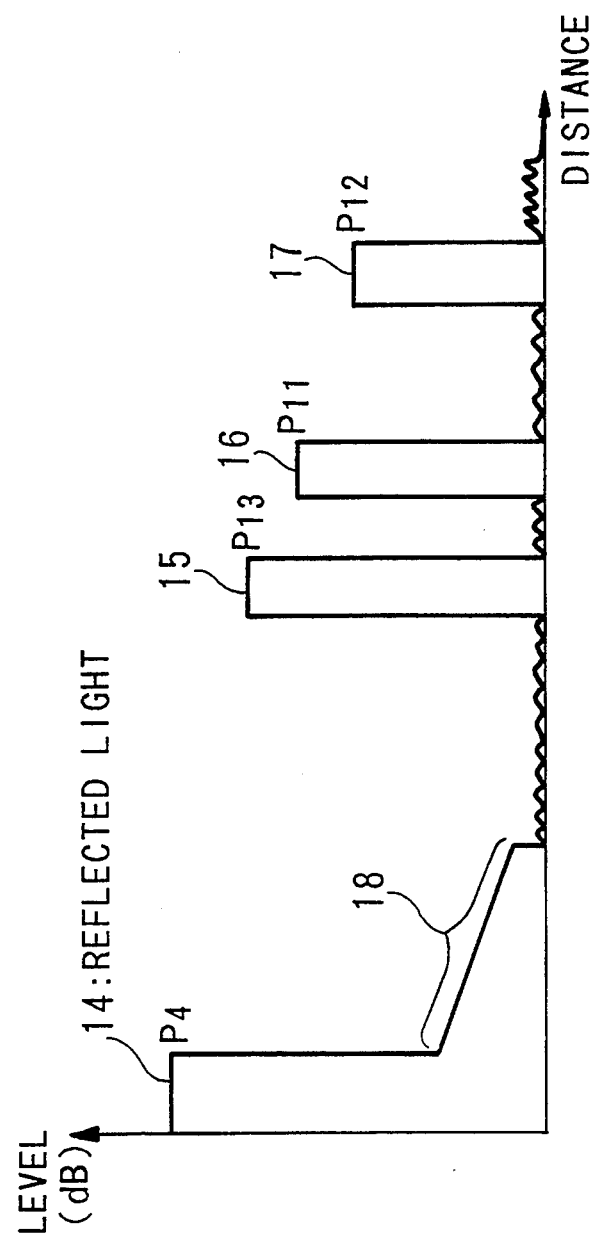
FIG. 2 is a pictorial view showing an example of a display of the OTDR, wherein the OTDR compensates for the distance to the origin of the source via the delay circuit 1.

FIG. 1 is a block diagram showing a measuring system according to an embodiment of the present invention, and FIG. 2 is a waveform of an optical pulse from the OTDR in this embodiment. The optical pulse outputted from the OTDR passes an optical waveguide directional coupler 2, and is then outputted to output terminals B and C thereof.

The optical pulse outputted from the output terminal C passes an optical variable attenuator 3, and reaches an optical reflector plate 4. The optical pulse reflected at the reflector plate 4 passes the optical variable attenuator 3 and the optical waveguide directional coupler 2, and then returns to the OTDR 1. In FIG. 2, the waveform of the optical pulse, which has returned to the OTDR 1 through the above-described path, is shown as reflected light 14 which is reflected by the optical reflector plate 4.

On the other hand, the optical pulse outputted from the output terminal B of the optical waveguide directional coupler 2, passes through an optical fiber cable 6, and reaches an optical branching waveguide 7. This optical pulse is divided by the optical branching waveguide 7, and is then outputted from output terminals E, F, G, . . . The optical pulse outputted from the output terminal E of the optical branching waveguide 7 passes through an optical fiber cable 8, and then reaches an optical reflector plate 11. This optical pulse is reflected by the optical reflector plate 11 and then returns to the OTDR 1 through the optical fiber cable 8, the optical branching waveguide 7, the optical fiber cable 6 and the optical waveguide directional coupler 2. In FIG. 2, the waveform of the optical pulse, which has returned to the OTDR 1 through the above-described path, is shown as a reflected optical pulse 16 which is reflected by the optical reflector plate 11.

In the same way, a reflected optical pulse 15, which is reflected by an optical reflector plate 12, and a reflected optical pulse 17, which is reflected by an optical reflector plate 13, are obtained as shown in FIG. 2. In this case, basically when the length of the optical fiber cable 8 is represented as L3, the length of the optical fiber cable 9 is represented by L9, the length of the optical fiber cable 10 is represented as L10, and the assumption is that a relationship between these lengths is such that $L_{10} < L_8 < L_9$. Furthermore, in FIG. 1, it is assumed that there is no reflection in the optical fiber cable except at the optical reflector plates 4, 11, 12, and 13.

In FIG. 2, back scattering light 18 is produced in the optical fiber cable, and this back scattering light 18 is ordinary back scattering light which can be observed by the OTDR 1.

Next, a method for determining the energy loss in the optical fiber cable will be described. It is assumed that the following values are already known.

$L_{2A-B}$ [dB]: energy loss between the input terminal A and the output terminal B of the optical branching waveguide 2;

$L_{2A-C}$ [dB]: energy loss between the input terminal A and the output terminal C of the optical branching waveguide 2;

$L_3$ [dB]: energy loss of the optical variable attenuator 3.

Furthermore, it is assumed that the optical reflector plates 4, 11, 12, and 13 reflect 100% of the light and that the energy loss thereof is 0 dB.

First, a level difference of each waveform is obtained according to the waveforms showing in FIG. 2.

Level difference $P_4-P_{11}$ between a level $P_4$ of the reflected light 14, which is reflected by the optical reflector plate 4, and a level $P_{11}$ of the reflected light 16, which is reflected by the optical reflector plate 11 is determined.

Level difference $P_4-P_{12}$ between a level $P_4$ of the reflected light 14, which is reflected by the optical reflector plate 4, and a level $P_{12}$ of the reflected light 17, which is reflected by the optical reflector plate 12 is determined.

Level difference $P_4-P_{13}$ between a level $P_4$ of the reflected light $P_4$, which is reflected by the optical reflector plate 4, and a level $P_{13}$ of the reflected light 15, which is reflected by the optical reflector plate 13 is determined.

Furthermore, the energy loss in the measuring optical fiber cable can be calculated to accordance with the following equations.

If each energy loss between the terminal B of the optical waveguide directional coupler 2 and the optical reflector plates 11, 12, 13, . . . , are designated energy losses $L_{11}, L_{12}, L_{13}, \ldots$, respectively, then each energy loss $L_{11}, L_{12}$ and $L_{13}$ may be represented as follows.

$$L_{11} = (P_4-P_{11}) + L_3 + L_{2A-C} - L_{2A-B},$$

$$L_{12} = (P_4-P_{12}) + L_3 + L_{2A-C} - L_{2A-B},$$

$$L_{13} = (P_4-P_{13}) + L_3 + L_{2A-C} - L_{2A-B}. \quad (1)$$

When the ratio of the branching of the optical waveguide directional coupler 2 is equal, that is, when $L_{2A-C} = L_{2A-B}$, the above equations (1) can be simply represented as follows.

$$L_{11} = (P_4-P_{11}) + L_3,$$

$$L_{12} = (P_4-P_{12}) + L_3,$$

$$L_{13} = (P_4-P_{13}) + L_3. \quad (2)$$

Furthermore, when the optical variable attenuator 3 is adjusted, for example, so as to be $(P_4-P_{11})=0$ in the OTDR 1, $L_{11}$ may be represented as follows.

$$L_{11} = L_3 \quad (3)$$

Therefore, the amount of energy loss in the optical fiber cable can be determined from the value of the energy loss of the optical variable attenuator 3.

FIG. 1 is a block diagram showing a measurement system for performing a measuring method of the present invention. In FIG. 1, the energy loss in the optical fiber cable itself can be measured; however, since there is an optical reflector plate at a terminal of the optical fiber cable, this measurement system can be used in an installed communication system.

Figure 3:
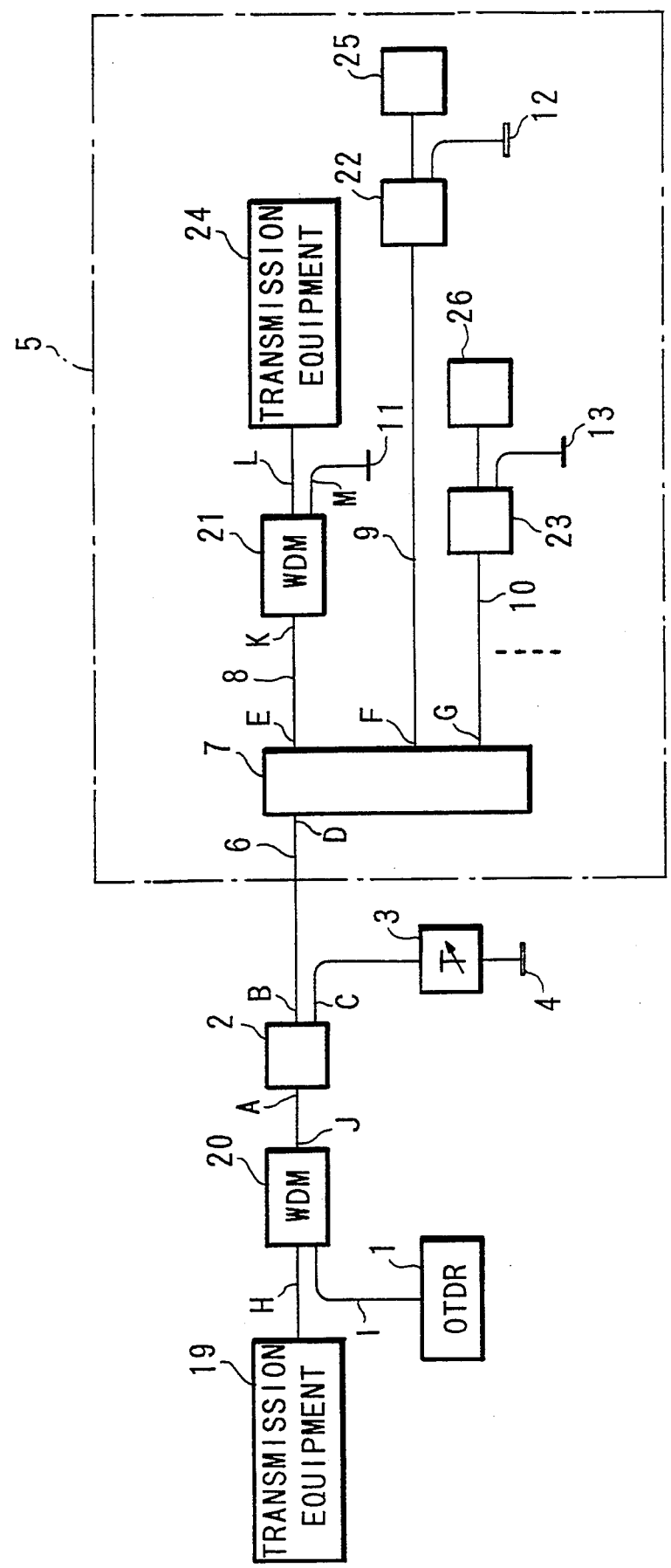
FIG. 3 is a block diagram showing a measuring system for measuring optical attenuation according to an embodiment of the present invention.
Figure 4:
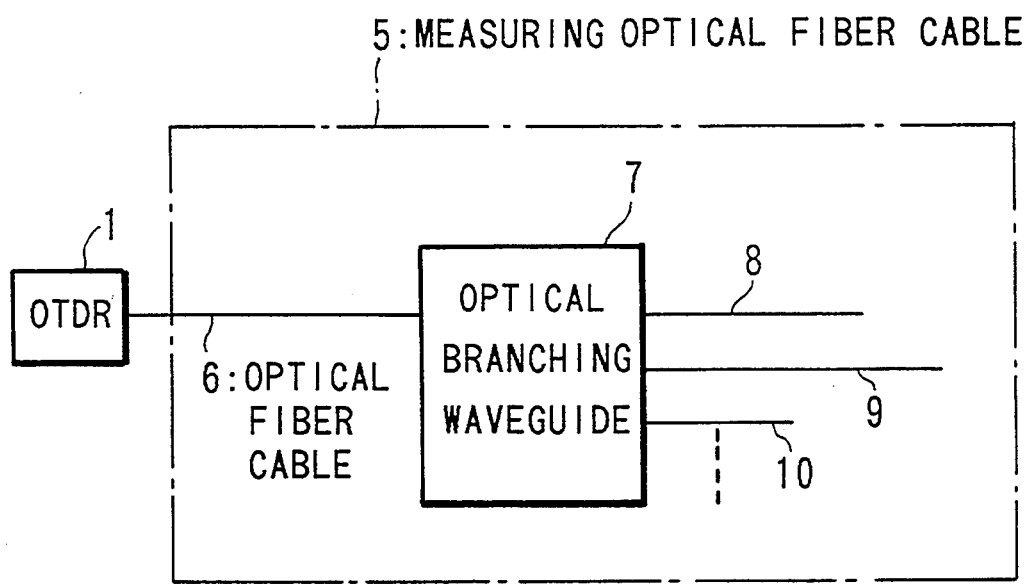
FIG. 4 is a block diagram showing a conventional measuring system for measuring optical attenuation.

Next, FIG. 3 is a block diagram showing a measurement system which may be applied in a real communication system.

In FIG. 3, an optical wavelength division multiplexing (WDM) unit 20 is connected between the OTDR 1 and the optical waveguide directional coupler 2. The terminal A of the optical waveguide directional coupler 2 and the output terminal J of the WDM unit 20 are connected, the input terminal H of the WDM unit 20 and the transmission equipment 19 are connected, and the input terminal I of the WDM unit 20 and the OTDR 1 are connected as shown FIG. 3. Furthermore, the WDM unit 21 is connected between the optical fiber cable 8 and the optical reflection plate 11. The optical fiber cable 8 and the input terminal K of the WDM unit 21 are connected, the output terminal L of the WDM unit 21 and the transmission equipment 21, for the communication, are connected, and the output terminal M of the WMD unit 21 and the optical reflection plate 11 are connected.

The WDM unit 22 and the transmission equipment 25 are also connected between the fiber cable 9 and the optical reflector plate 12, and the WDM unit 23 and the transmission apparatus 26 are connected between the optical fiber cable 10 and the optical reflector plate 13, respectively.

Here, it is considered that the transmission equipment 19 is transmission equipment in the telephone company office, and the transmission equipment 24–26 are transmission equipment of end users. Furthermore, the wavelength of the transmitted light is λ1, a wavelength of the measurement light is λ2. Additionally, characteristics of the WDM units 20 and 21 are shown in the following Table 1.

TABLE 1

| | |
|---|---|
| Between Terminals H and J, and Between Terminals K and L | λ1 Can Pass Through, λ2 Cannot Pass Through |
| Between Terminals I and J, and Between Terminals K and M | λ1 Cannot Pass Through, λ2 Can Pass Through |

In this case, the energy loss measuring procedures used for the measuring optical fiber cable 5 are the same as in the case of FIG. 1. If the energy loss for inputting of the WDM unit 21 is 0 dB, a value of tile energy loss can be obtained by using Equations (1) above, and the Equations (2) and (3) are also concluded. The wavelength λ2 of the transmission light may be 1.55 μm when the wavelength λ1, for example, is 1.3 λm.

The energy loss of the optical fiber cable 5, which is measured by light of wavelength λ1, practically differs from the energy loss of the optical fiber cable 5, which is measured by light of wavelength λ2. However, if the purpose of the measurement is maintenance and inspection of the optical fiber cable, this measurement system can obtain adequate results. This is because phenomena, such as an increase of the energy loss due to degradative changes, are observed if the energy loss, which is measured by light of wavelength λ1, and the energy loss, which is measured when this network is installed, are compared.

Figure 5:
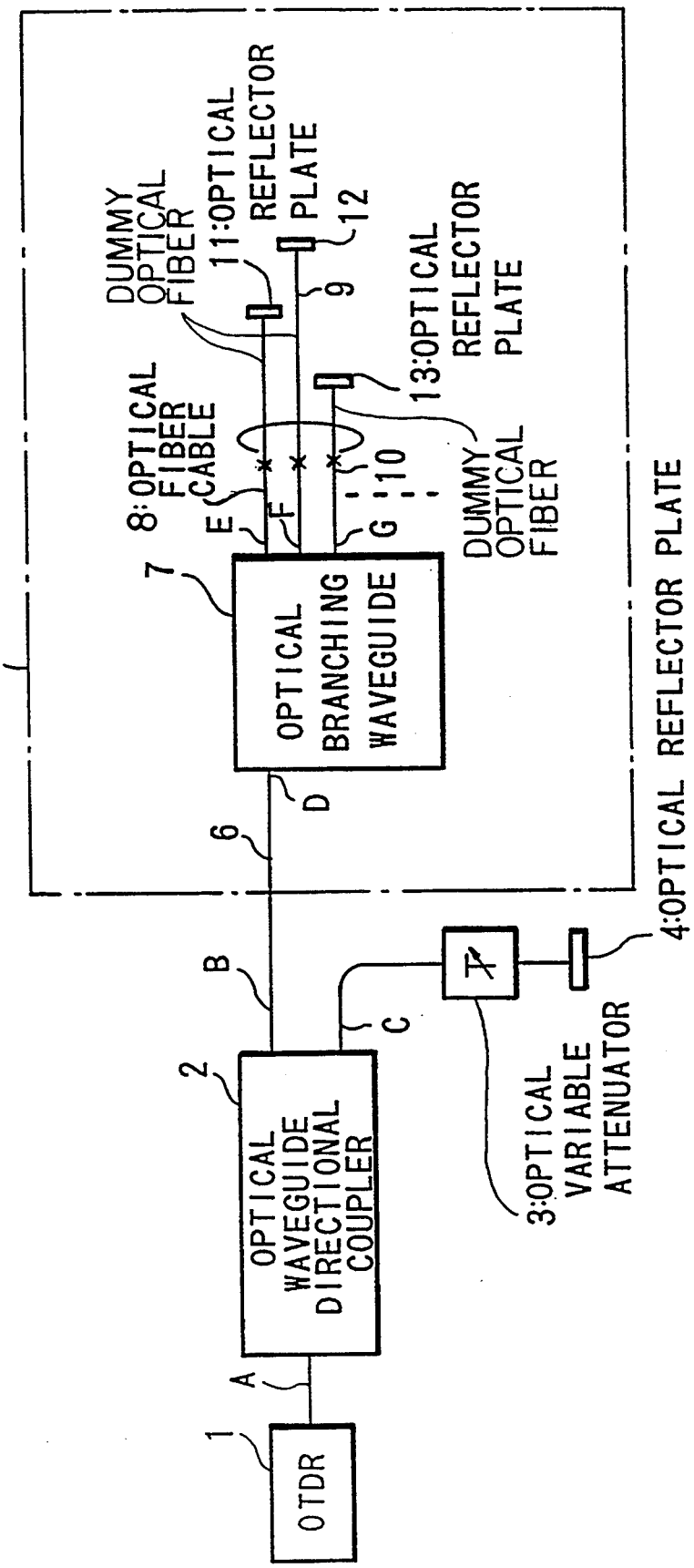
FIG. 5 is a block diagram showing a measuring system for measuring optical attenuation in accordance with a further embodiment of the present invention.

As shown in FIG. 5, if distances between the OTDR 1 and each end user, that is, the distances L8, L9, L10, ..., are all of similar value, this measuring method cannot be used. In this case, there is no problem in that L8≠L9≠L10 ... by additionally mounting dummy optical fibers.

What is claimed is:

1. A method of measuring optical attenuation in an optical fiber cable network by using an optical time domain reflectometer, said optical fiber cable network including an optical branching waveguide having at least one input terminal and a plurality of output branching terminals, a first optical fiber, a first terminal thereof being connected to said input terminal of said optical branching waveguide, a plurality of second optical fibers being connected to corresponding ones of said plurality of output branching terminals of said optical branching waveguide, said method of measuring optical attenuation comprising the steps of:

connecting said optical time domain reflectometer to an input of an optical waveguide directional coupler through a first optical wavelength division multiplexing unit, said optical waveguide directional coupler having at least two output branching terminals;

connecting a second terminal of said first optical fiber to a first terminal of said at least two output branching terminals of said optical waveguide directional coupler, and terminating a second terminal of said at least two output branching terminals of said waveguide directional coupler with an additional reflector via an optical variable attenuator, which can change the optical attenuation of light passing therethrough;

terminating each terminal of said plurality of second optical fibers with an optical reflector plate through a corresponding plurality of second optical wavelength division multiplexing units;

supplying a light pulse from said optical time domain reflectometer; and measuring optical attenuation of said plurality of second optical fiber cables by detecting differences in the intensity of reflected light pulses which are reflected at each of said plurality of optical reflector plates and comparing these differences to a reflected light pulse reflected by said additional reflector plate.

2. A method of measuring optical attenuation according to claim 1, further including the step of:

connecting a plurality of dummy optical fibers of different lengths between respective terminals of said plurality of optical fibers and said terminating optical reflector plates when said plurality of optical fibers are the same length.

3. A method of measuring optical attenuation according to claim 1, further comprising the step of:

connecting a transmission equipment to each of said plurality of optical wavelength division multiplexing units, respectively.

4. A method of measuring optical attenuation according to claim 3, wherein said transmission equipment outputs optical light having a wavelength of 1.3 microns, and said optical time domain reflectometer outputs optical light having a wavelength of 1.55 microns.

* * * * *